United States Patent [19]
de Jenlis

[11] Patent Number: 6,125,234
[45] Date of Patent: Sep. 26, 2000

[54] COOKING APPARATUS WITH TRANSPARENT HEATING PLATES

[75] Inventor: Pascal de Jenlis, Saint Cloud, France

[73] Assignee: Robot-Coupe(S.N.C.), Montceau-les-Mines, France

[21] Appl. No.: 09/214,926

[22] PCT Filed: May 15, 1998

[86] PCT No.: PCT/FR98/00970

§ 371 Date: Mar. 11, 1999

§ 102(e) Date: Mar. 11, 1999

[87] PCT Pub. No.: WO98/52451

PCT Pub. Date: Nov. 26, 1998

[30] Foreign Application Priority Data

May 16, 1997 [FR] France .................................. 97 06031

[51] Int. Cl.[7] .................................................. A47J 37/08
[52] U.S. Cl. .......................... 392/439; 392/435; 392/418; 219/521; 219/543; 219/385; 99/389
[58] Field of Search .................................... 392/432, 433, 392/435, 438, 439, 407, 418; 99/389–392; 219/411, 408, 409, 385, 460.1, 462.1, 465.1, 466.1, 468.1, 521, 553, 522, 543, 524, 386

[56] References Cited

U.S. PATENT DOCUMENTS

| | | | |
|---|---|---|---|
| 2,564,677 | 8/1951 | Davis | 99/389 |
| 2,564,706 | 8/1951 | Mochel | 99/389 |
| 2,777,044 | 1/1957 | Lytle | 219/543 |
| 3,737,624 | 6/1973 | Eilenberger | 392/432 |
| 3,919,441 | 11/1975 | Horiki | 428/426 |
| 4,346,651 | 8/1982 | Schickedanz | 99/392 |
| 4,713,530 | 12/1987 | Schittenhelm et al. | 219/543 |
| 4,791,862 | 12/1988 | Hoffmann | 99/385 |
| 4,970,375 | 11/1990 | Schittenhelm et al. | 219/543 |
| 5,119,467 | 6/1992 | Barsky et al. | 392/439 |
| 5,138,938 | 8/1992 | McClean | 219/386 |
| 5,896,808 | 4/1999 | Graur | 219/521 |
| 5,960,702 | 10/1999 | Thiriat et al. | 99/389 |

FOREIGN PATENT DOCUMENTS

| | | |
|---|---|---|
| 2707858 | 1/1995 | France . |
| 2130555 | 12/1972 | Germany . |
| 2339825 | 3/1975 | Germany . |
| 3047780 | 7/1982 | Germany . |

OTHER PUBLICATIONS

Patent Abstracts of Japan, vol. 004, No. 038 (C–004), Mar. 27, 1980, of Japanese Patent Application No. 55 010466 (Seiko Epson Corp.), dated Jan. 24, 1980.

*Primary Examiner*—John A. Jeffery
*Attorney, Agent, or Firm*—Greenblum & Bernstein, P.L.C.

[57] ABSTRACT

Electrical apparatus for thermal processing of food includes a casing which has a transparent portion for viewing the food disposed within the casing. At least one heating element is mounted within the casing for heating the food, the heating element including a heat resistant and mechanically rigid transparent first substrate having a first surface which faces the food and a second opposite facing surface. At least one electrical resistance element is disposed on the second surface, the at least one electrical resistance element being connected to a source of electrical current. At least one second transparent substrate is disposed adjacent the second surface, the at least one second transparent substrate including a transparent infrared reflective coating. Thus, the food disposed within the casing is viewable from the exterior of the casing through at least the first substrate while the food is being heated by the first substrate.

19 Claims, 2 Drawing Sheets

COOKING APPARATUS WITH TRANSPARENT HEATING PLATES

BACKGROUND OF THE INVENTION

1. Field of the Invention

The instant invention is related to an electrical apparatus for the thermal processing of foodstuff, enabling the grilling, cooking, reheating or keeping warm of foodstuff, via a heating body implementing the Joule effect.

2. Description of Background and Relevant Information

Heating food via electrical means, such as by microwaves, induction, or still by the Joule effect is becoming increasingly more common.

It is known that electrical toasters currently in use generally have a casing, open at its upper part, inside of which are arranged at least one pair of parallel plates between which the bread to be toasted can be inserted. Generally, these plates hold an assembly of resistances that are either exposed or covered in a quartz sheathing. The bread itself can be placed in a vertically mobile support such that the bread slices are automatically ejected from the casing after a pre-determined heating interval, or after a pre-determined temperature has been attained. The toasting action consists of toasting the external surface of a slice of bread, whereas the inner volume remains soft, but hot. In electrical toasters, energy is produced by the Joule effect as a result of current passing through the resistances. The energy thus released is transmitted via radiation over each of the surfaces of the bread according to a factor that is proportionate to the fourth power of the absolute temperature in accordance with the laws of Stephan and Boltzman.

But for safety reasons, access to the heating resistances is naturally restricted and it is impossible to follow the progress of the operation without interrupting the toasting process, in order to stop it at just the right time.

SUMMARY OF THE INVENTION

The main object of the instant invention is to overcome this disadvantage and to allow a visual monitoring of the progress of the bread inserted into the toaster, or of any other food processed in the same way, by increasing visibility without reducing the heating surface. In addition, the reduction of the number of parts naturally decreases manufacturing costs and boosts reliability.

According to the invention, the electrical apparatus for the thermal processing of foodstuff having a support frame in which at least one heating element is mounted, is characterized in that said heating element is constituted of an electrical resistance, connected to a source of electrical current, adjacent to at least one transparent substrate that is mechanically and heat resistant.

The mechanically and heat resistant substrate can be made from a monolithic glass plate or a laminated glass plate or a polymer plate. The electrical resistance can be affixed on a transparent substrate, inserted between two transparent substrates, or be constituted of a planar conducting coating arranged on a plate.

The continuous electrically resistant coating is advantageously a transparent semi-conducting oxide coating, especially tin oxide doped with antimony or fluorine or indium oxide doped with tin, the resistant coatings emitting, in the temperature range of the thermal processing, a radiation whose wave length is on the order of 7 microns.

Glass plates coated on one of their surfaces with a thin, transparent electro-conducting coating having low emissivity and being infra-red reflecting are available commercially, the conducting coating generally being tin oxide doped with antimony or fluorine, or indium oxide doped with tin, and deposited in a thickness of 0.2 and 0.5 microns, for example, 0.3 to 0.4 microns. Surface resistivity can range from a few $\Omega/\square$ to a few hundred $\Omega/\square$, for example, 10 to 100 $\Omega/\square$. The conducting coating behaves like an electrical resistance whose value is a function of the length/width ratio. Due to the passage of current, this coating gets heated and also heats the glass plate or, more generally, the substrate. It has been noted that when the surface resistance of the glass (non-coated with a coating) is on the order of $10^{12}$ $\Omega/\square$, the emissivity of the surface beside this coating is 0.15 and 0.9 on the opposite side. A heating plate thus emits an asymmetrical radiation in the proportions of 0.9 to 0.15. According to Kirchoff's law, radiation is only emitted over wave lengths for which the glass plate has an absorption band. This band is located on the wave lengths comprised between 5 and 20 microns. Infra-red reflecting ability is 85% beside the coating and 4% on the opposite side. The glass-coating assembly remains transparent to light.

Such glasses are manufactured for tin oxide coatings by the big glass manufacturing companies such as SAINT GOBAIN. Substrates coated with indium oxide coatings are commonly found in the field of electronics. Deposits are generally carried out by vacuum cathode spray methods or liquid or gaseous phase pyrolysis methods. These glasses are mainly marketed for the manufacture of glass panes that allow the penetration of the visible spectrum of sunlight and conversely, reflect infra-red radiation at higher wavelengths. Such glasses are sometimes used to manufacture windshields, allowing defogging by the Joule effect at a low temperature, or in the manufacture of photoelectric cells or display units.

The power supply in a thin coating is advantageously obtained via two fine conducting bands arranged, for example, along the two opposing edges of the plate, and to each of which is welded a conductor connected to a voltage source.

In another embodiment, the resistance is constituted by a resistant metallic wire pressed onto a transparent substrate or inserted between two transparent substrates. Preferably, the wire is a thin wire the disposition of which is selected to not substantially alter the optical density of the resultant heating element, i.e., without substantially decreasing visibility.

The value of the electrical resistance of a heating element according to the invention is selected in such a way that the surface temperature of the heating element is comprised between 150 and 300° C.

In the case of a toaster, the internal temperature must be on the order of 250° C., which means that the glasses coated with the thin coatings must be designed in mass or treated in view of their resistance to thermal shocks. The fact that the surface temperature of the heating element remains comprised between 150 and 300° C. is clearly an advantage with respect to current toasters and their extremely high temperatures.

The heating body can itself be made of laminated glass, the conducting coating being integrated between the two laminates. In some cases, this conducting coating can be constituted of resisting wires that are sandwiched between the two glass coatings, without very substantially decreasing visibility.

In the case where the heating element is a continuous coating, it is possible to protect the heating plate against the possibility of electrical short circuits and, to this end, a heat resistant and transparent electrical insulation coating can be attached on the conducting coating, such as a coating of glass, silica, chromium oxide, titanium oxide.

Preferably, a second pair of plates, one surface of which is coated with a transparent coating having low emissivity and being infra-red reflecting is arranged in parallel with the first on the side opposite of the food, across and at a distance from the heating element. It is the aim of such plates to reduce energy losses towards the outside and to ensure an external apparatus temperature that poses no safety hazards for the user. The aim of said reflecting coating is to block the infra-red radiation emitted by the heating element towards the outside, said reflecting coating re-emitting a part of the emitted radiation towards the thin conducting coating. This allows losses towards the outside to be limited and ensures that the temperature of the apparatus is such as to pose no danger for the user.

The transparent coating which reflects infra-red is mainly selected from among the materials previously mentioned, which simplifies the construction of the apparatus.

In the case of a toaster, the support receives at least two parallel and vertical heating elements such as previously defined, the bread to be toasted being then arranged in the compartment or compartments demarcated by the heating plates. In case provision has been made for additional infra-red reflecting substrates, these are naturally attached only to the end elements. In addition, the toaster support advantageously comprises an opening in its walls across from the heating elements, such that the entirety of such heating elements remains visible. The support can take the shape of a traditional casing, or that of a simple frame. It can be obtained with the possibility of enabling the disassembly of the heating plates, facilitating their cleaning, especially in a dishwater.

BRIEF DESCRIPTION OF THE DRAWINGS

Other characteristics and advantages of the instant invention will emerge from the description of a preferred embodiment that follows, provided only as a non-restrictive example, with reference to the annexed drawings representing.

DETAILED DESCRIPTION OF THE INVENTION

The example that has been provided relates to a toaster, but the invention can also find an application, in other grilling, cooking, reheating or warming devices.

Figure 1:
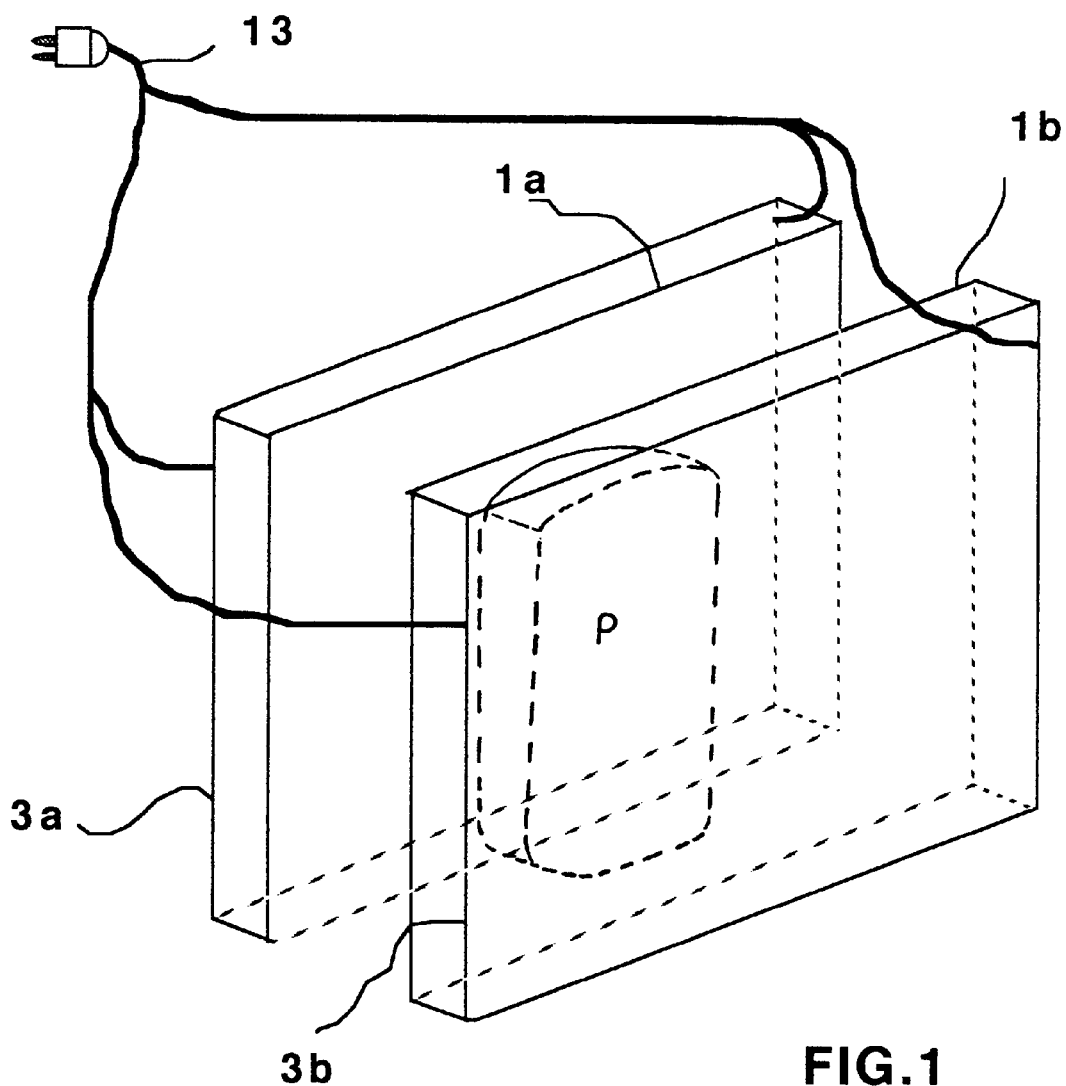
FIG. 1, a schematic diagram.

FIG. 1 is a schematic diagram of the invention. The food to be grilled, in this case a slice of bread P, is arranged between two glass sheets 1a, 1b, externally coated with conducting coatings 3a, 3b, for example, of tin oxide doped with antimony or fluorine. The coatings 3a, 3b are connected electrically to a source of current which can be alternating, the phenomenon used being the Joule effect. The passage of the current emits heat which toasts the bread P.

Figure 2:
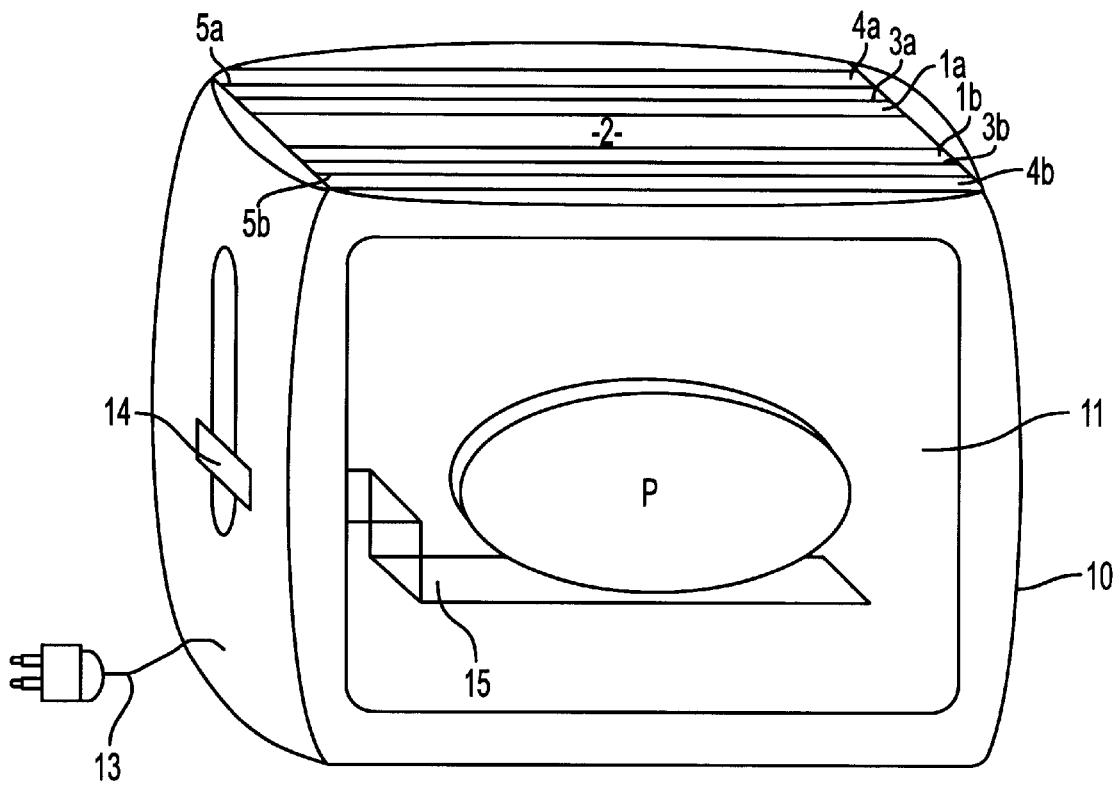
FIG. 2, a schematic perspective view of a toaster according to the invention.

In FIG. 2, one can see that a variety of parallel plates are mounted in a casing 10. The casing 10 generally has the shape of a "U" such that its two larger lateral surfaces 11 (only one of which can be seen in the Figure) are open at their upper ends which can be closed with a cover (not shown) leaving a central slit 2 open for introducing a slice of bread P to be toasted. The slice of bread P can be seen, naturally, when one looks from the top of the slit 2, but also when one looks through the surfaces 11.

Inside the casing 10 are assembled, from the center, two glass plates 1a, 1b that are symmetrical with respect to the axis of the slit 2. According to the invention, the glass plates are coated, externally, with a thin conducting coating, respectively 3a and 3b. On the exterior of this assembly of two plates 1a, 1b are mounted two other plates, respectively 4a and 4b which are glass plates whose surface can be larger than the surface of the conducting coatings 3a and 3b so as to avoid any accidental electrical contact. The plates 4a and 4b have, on the side turned towards the conducting coatings 3a and 3b, a reflecting coating respectively 5a and 5b reflecting the infra-red and adapted to return, at least partially, the radiation emitted thereby on the conducting coating.

Naturally, the symmetrical nature of the construction that has just been described is a function of the fact that one generally wants to simultaneously toast both sides of the same piece of bread; naturally, it would be possible to construct a toaster having a single heating surface in which the two surfaces could be toasted one after another. This face could obviously be horizontal.

One also sees, in the FIG. 2, a power cord 13 allowing the toaster to be connected to a source of current, generally of 110 or 220 volts and a lever 14 connected to a fork 15 allowing the slice of bread (P) to be raised or lowered at the end and at the beginning of the operations. It is possible to provide on the conducting coatings 3a and 3b a protection, that insulates the coating from the outside, for example, a coating of silica, chromium oxide, titanium oxide or of a transparent polymer.

Figure 3:
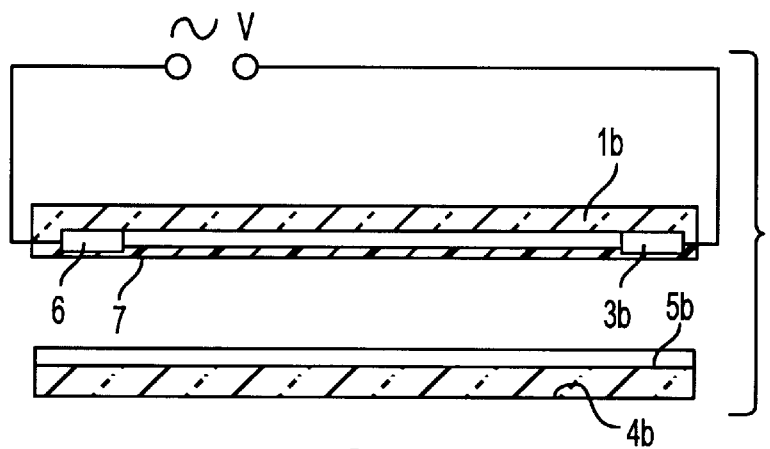
FIG. 3, a partial top view of the same toaster.

FIG. 3 represents, in a top view, the plate assembly on one side of the toaster. One can see that on the glass plate 1b is deposited a thin conducting coating 3b made, for example, of tin oxide doped with antimony or fluorine, or indium oxide doped with tin. The thickness of the coating 3b is a few tenths of a micron. Across from the coating 3b, there is an infra-red reflecting coating 5b, this coating 5b being turned towards the coating 3b; the distance between the coatings 3b and 5b is on the order of about 5 mm. The coating 3b has, at its two vertical ends, electrodes 6 constituted by wide bands that allow to apply a voltage to each of the edges. The energy radiated by the coating 3b towards the inside of the toaster is on the order of 1300 watts/m$^2$. The maximum wave length radiated is 7 microns which corresponds to the absorption bands of most food items.

Although the preceding description is related to a toaster, it is understood that the heating method used can find an application in other fields for heating foodstuff.

According to another embodiment (not represented), the heating is controlled by a photoelectric cell arranged on the outside of the apparatus and directed towards the outside thereof. This cell, which acts on the power supply, detects the change in the color of the food, for example of the bread, during the cooking process. The instant invention lends itself to the manufacture of transparent and aesthetically pleasing hot plates.

In all the applications, heat is transmitted by radiation or by contact. In some cases, at least a part of the apparatus may be opaque.

It is understood that numerous variations can be provided, especially by substitution of equivalent technical means, without however, leaving the scope of the invention

What is claimed is:

1. An electrical apparatus for thermal processing of food, the apparatus comprising:
   a casing which comprises a transparent portion for viewing the food disposed within the casing;
   at least one heating element mounted within the casing for heating the food, the heating element comprising a heat resistant and mechanically rigid transparent first substrate having a first surface which faces the food and a second opposite facing surface;
   at least one electrical resistance element disposed on the second surface, the at least one electrical resistance element being connected to a source of electrical current;
   at least one second transparent substrate disposed adjacent the second surface, the at least one second transparent substrate comprising a transparent infrared reflective coating,
   wherein the food disposed within the casing is viewable from the exterior of the casing through at least the first substrate while the food is being heated by the first substrate.

2. The electrical apparatus of claim 1, wherein the at least one electrical resistance element comprises a semi-conducting oxide coating, the semi-conductive oxide coating comprising a thickness in the range of approximately 0.2 and 0.5 microns and a surface resistivity in the range of approximately 10 and 100 $\Omega/\Box$.

3. The electrical apparatus of claim 2, wherein the semi-conducting oxide coating comprises one of tin oxide doped with antimony, tin oxide doped with fluorine, and indium oxide doped with tin,
   the semi-conductive oxide coating emitting a radiation having a wavelength of approximately 7 micron.

4. The electrical apparatus of claim 1, wherein a resistivity of the at least one electrical resistance element comprises a value wherein a surface temperature of the at least one heating is in the range of approximately 100° C. and 300° C.

5. The electrical apparatus of claim 1, wherein the first transparent substrate comprises at least one glass plate.

6. The electrical apparatus of claim 1, wherein the first transparent substrate comprises a transparent coating for insulating the at least one electrical resistance element, the transparent coating comprising one of silica, chromium oxide, titanium oxide, and a polymer.

7. The electrical apparatus of claim 1, wherein the casing comprises a toaster casing,
   the toaster casing further comprising a food inserting opening at an uppermost surface portion,
   said at least one heating element comprising two substantially parallel heating elements,
   said two parallel heating elements being disposed on opposite sides of the food inserting opening,
   said at least one second transparent substrate comprising two transparent second substrates with each disposed between the casing and the first substrate.

8. The electrical apparatus of 1, wherein the casing further comprises at least one transparent side wall which is substantially parallel to the at least one heating element.

9. The apparatus according of claim 8, wherein the at least one transparent side wall comprises a heat resistant material.

10. An electrical apparatus for thermal processing of food, the apparatus comprising:
    a casing which comprises a transparent portion for viewing the food disposed within the casing;
    at least one heating element mounted within the casing for heating the food, the heating element comprising a heat resistant and mechanically rigid transparent first substrate having a first surface which faces the food and a second opposite facing surface;
    at least one electrical resistance element comprising a semi-conducting oxide coating disposed on the second surface, the at least one electrical resistance element being connected to a source of electrical current;
    at least one second transparent substrate disposed adjacent the second surface, the at least one second transparent substrate comprising a transparent infrared reflective coating,
    wherein the food disposed within the casing is viewable from the exterior of the casing through at least the first substrate while the food is being heated by the first substrate.

11. The electrical apparatus of claim 10, wherein the semi-conductive oxide coating comprises a thickness in the range of approximately 0.2 and 0.5 microns and a surface resistivity in the range of approximately 10 and 100 $\Omega/\Box$.

12. The electrical apparatus of claim 10, wherein a resistivity of the at least one electrical resistance element comprises a value wherein a surface temperature of the at least one heating is in the range of approximately 100° C. and 300° C.

13. The electrical apparatus of claim 10, wherein the first transparent substrate comprises at least one glass plate.

14. The electrical apparatus of claim 10, wherein the first transparent substrate comprises a transparent coating for insulating the at least one electrical resistance element, the transparent coating comprising one of silica, chromium oxide, titanium oxide, and a polymer.

15. The electrical apparatus of claim 10, wherein the semi-conducting oxide coating comprises one of tin oxide doped with antimony, tin oxide doped with fluorine, and indium oxide doped with tin,
    the semi-conductive oxide coating emitting a radiation having a wavelength of approximately 7 micron.

16. The electrical apparatus of claim 10, wherein the casing comprises a toaster casing,
    the toaster casing further comprising a food inserting opening at an uppermost surface portion,
    said at least one heating element comprising two substantially parallel heating elements,
    said two parallel heating elements being disposed on opposite sides of the food inserting opening,
    said at least one second transparent substrate comprising two transparent second substrates with each disposed between the casing and the first substrate.

17. The electrical apparatus of 10, wherein the casing further comprises at least one transparent side wall which is substantially parallel to the at least one heating element.

18. The apparatus according of claim 17, wherein the at least one transparent side wall comprises a heat resistant material.

19. An electrical apparatus for thermal processing of food, the apparatus comprising:
    a casing which comprises a transparent portion for viewing the food disposed within the casing;
    at least one heating element mounted within the casing for heating the food, the heating element comprising a heat resistant and mechanically rigid transparent first substrate having a first surface which faces the food and a second opposite facing surface;

at least one electrical resistance element disposed on the second surface, the at least one electrical resistance element being connected to a source of electrical current;

the at least one electrical resistance element comprising a semi-conducting oxide coating, the semi-conductive oxide coating comprising a thickness in the range of approximately 0.2 and 0.5 microns and a surface resistivity in the range of approximately 10 and 100 $\Omega/\square$;

at least one second transparent substrate disposed adjacent the second surface, the at least one second transparent substrate comprising a transparent infrared reflective coating, wherein the food disposed within the casing is viewable from the exterior of the casing through at least the first substrate while the food is being heated by the first substrate.

* * * * *